(12) United States Patent
Hansson (10) Patent No.: US 12,267,038 B2
(45) Date of Patent: Apr. 1, 2025

(54) SOLAR PANEL ROOF

(71) Applicant: Raymond Solar AB, Mölnlycke (SE)

(72) Inventor: Mattias Hansson, Mölnlycke (SE)

(73) Assignee: RAYMOND SOLAR AB, Mölnlycke (SE)

( * ) Notice: Subject to any disclaimer, the term of this patent is extended or adjusted under 35 U.S.C. 154(b) by 251 days.

(21) Appl. No.: 18/001,820

(22) PCT Filed: Jun. 16, 2021

(86) PCT No.: PCT/EP2021/066277
§ 371 (c)(1),
(2) Date: Dec. 14, 2022

(87) PCT Pub. No.: WO2021/255112
PCT Pub. Date: Dec. 23, 2021

(65) Prior Publication Data
US 2023/0231509 A1   Jul. 20, 2023

(30) Foreign Application Priority Data

Jun. 16, 2020   (SE) .................................... 2050723-2

(51) Int. Cl.
*H02S 20/23*      (2014.01)
(52) U.S. Cl.
CPC .................... *H02S 20/23* (2014.12)
(58) Field of Classification Search
CPC ....... H02S 20/23; H02S 20/26; E04D 3/3608; E04D 3/38; E04D 12/004;
(Continued)

(56) References Cited

U.S. PATENT DOCUMENTS

| 8,794,583 | B2 * | 8/2014 | Poivet | F24S 25/35 |
| | | | | 248/500 |
| 10,224,864 | B2 * | 3/2019 | Arasaki | H02S 20/23 |

(Continued)

FOREIGN PATENT DOCUMENTS

| DE | 29604465 U1 | 5/1996 |
| DE | 202011100615 U1 | 7/2011 |

(Continued)

OTHER PUBLICATIONS

Amendment filed by Applicant in counterpart European Application No. 21734779.8 (11 pages). (Year: 2023).*
International Search Report and Written Opinion for Int'l Application No. PCT/EP2021/066277, titled: Solar Panel Roof, Dated: Sep. 30, 2021.

(Continued)

*Primary Examiner* — Rodney Mintz
(74) *Attorney, Agent, or Firm* — Hamilton, Brook, Smith & Reynolds, P.C.

(57) ABSTRACT

A solar panel system comprising a plurality of joists, and a set of rectangular solar panels, each solar panel supported along opposing sides by two supporting joists. Each joist is formed with a plurality of wedge-shaped recesses, each recess having an end surface and a flat, sloping supporting surface meeting with a bottom edge of the end surface, the plurality of recesses together forming a saw-tooth contour. Each solar panel is received in the recesses of its supporting joists, resting on the supporting surfaces of the recesses with an upper edge of the solar panel meeting the end surfaces of the recesses, such that an upper solar panel has a lower edge which protrudes over an upper edge of a lower solar panel. With this design, the recesses provide guiding and fixation during the mounting, which saves time and ensures a reliable mounting process.

18 Claims, 7 Drawing Sheets

(58) Field of Classification Search
CPC .......... E04D 2003/0893; F24S 2020/13; F24S 25/35; F24S 2025/803
See application file for complete search history.

(56) References Cited

U.S. PATENT DOCUMENTS

| | | | | |
|---|---|---|---|---|
| 12,134,896 B2* | 11/2024 | Gisler | ................... | H02S 20/23 |
| 2011/0215213 A1* | 9/2011 | Poivet | ................... | F24S 25/00 |
| | | | | 248/309.1 |
| 2013/0139468 A1* | 6/2013 | Poivet | ................... | F24S 25/20 |
| | | | | 52/741.1 |
| 2018/0138855 A1* | 5/2018 | Arasaki | ................ | H02S 20/23 |
| 2022/0393635 A1* | 12/2022 | Eriksson | ............... | F24S 25/615 |
| 2023/0039474 A1* | 2/2023 | Gisler | ................... | H02S 20/25 |

FOREIGN PATENT DOCUMENTS

| | | | |
|---|---|---|---|
| EP | 1734588 | A2 | 12/2006 |
| ES | 1071742 | U | 3/2010 |
| GB | 2476256 | A | 6/2011 |
| JP | H0265362 | U | 5/1990 |
| JP | H05280168 | A | 10/1993 |
| JP | H0627967 | Y2 | 7/1994 |
| KR | 101470325 | B1 | 12/2014 |
| WO | 2013092682 | A2 | 6/2013 |
| WO | 2021255112 | A1 | 12/2021 |

OTHER PUBLICATIONS

Swedish Search Report for Swedish Application No. 2050723-2, titled: Solar Panel Roof, Dated: Feb. 4, 2021.

* cited by examiner

SOLAR PANEL ROOF

This application is the U.S. National Stage of International Application No. PCT/EP2021/066277, filed on Jun. 16, 2021, which designates the U.S., published in English, and claims priority under 35 U.S.C. § 119 or 365(c) to Swedish Application No. 2050723-2, filed on Jun. 16, 2020. The entire teachings of the above applications are incorporated herein by reference.

FIELD OF THE INVENTION

The present invention relates to a solar panel roof system. The invention is particularly (but not exclusively) useful for so called integrated solar panel roofs.

BACKGROUND OF THE INVENTION

With the increasing interest in solar energy, it has become increasingly popular to arrange solar panels on the roofs of houses, including private homes. By providing a private home with solar panels (rectangular elements covered by solar cells) on at least a portion of the roof surface, the home owner may generate electricity for personal use as well as for delivery onto the electrical grid. Some governments provide tax incentives for installing such solar panel installations, and also incentivize the delivery of solar power into the national grid.

In many cases, the solar panels are mounted on top of a weather protecting surface of the existing roof. Such a weather protecting surface may be tar paper, sheet metal, or tiles. Such a "retrofit" installation of solar panels typically involves attaching suitable mounting brackets, onto which the solar panels are then mounted. The mounting brackets need to be attached without jeopardizing the weather protection of the roof. There is typically a separation between the original roof and the solar panels, enabling air to circulate and cool the underside of the panels.

In other cases, solar panels are installed when building a new house, or when replacing the roof (for example, roof tiles typically have a life span of about 30 years and then need to be replaced). For this purpose, there are commercially available solar panels which can serve not only as solar cells, but also as the weather protection of the roof. One example of such solar panels sold by Gruppsol AB, are shown at www.gruppsol.com. A roof construction where at least part of the weather protective outer layer is formed of solar panels is sometimes referred to as "integrated" solar panels. This is a potentially cost efficient approach, with one roof covering layer instead of two.

There is a constant strive for improvements in solar panel roof systems, regardless of whether the panels are "retrofitted" or part of an integrated solar panel roof.

GENERAL DISCLOSURE OF THE INVENTION

It is an object of the present invention to provide a solar panel roof system which is easy to mount and which provides an improved structural strength.

According to a first aspect of the present invention, this object is achieved by a solar panel system mounted on a roof of a building, comprising a plurality of joists arranged substantially normal to an upper ridge of the roof, and extending from the upper ridge to a lower region of the roof, and a set of rectangular solar panels, each solar panel supported along opposing sides by two supporting joists. Each joist is formed with a plurality of wedge-shaped recesses, each recess having, in an end closest to the upper ridge, an end surface normal to the roof extending across the width of the joist, and a flat, sloping supporting surface meeting with a bottom edge of the end surface, the plurality of recesses together forming a saw-tooth contour, the end surface having a height substantially corresponding to a thickness of the solar panels, wherein each solar panel is received in the recesses of its supporting joists, resting on the supporting surfaces of the recesses with an upper edge of the solar panel meeting the end surfaces of the recesses, and wherein an upper solar panel has a lower edge which protrudes over an upper edge of a lower solar panel.

With this design, the recesses provide guiding and fixation during the mounting, which saves time and ensures a reliable mounting process.

Further, as the upper edge of each lower solar panel is recessed, an upper solar panel may protrude over this upper edge and still be supported under the entire length of its opposing sides. Most of the upper panel is supported by the supporting surfaces of the recesses it is received by, and its lower edge is supported by the upper edge of the lower solar panel. The recesses thus allow overlap between solar panels without reducing the structural strength of the solar panel system. The overlap is beneficial as it contributes to providing a more water-proof, and even more air-tight, system.

According to one approach, each joist is made in one piece, e.g. of wood or aluminum. However, it may be beneficial to assemble the joists on site.

In one embodiment, each joist is made of a set of right trapezoid sections, each section forming the supporting surface of one recess. During mounting of the solar panel system, the joists are formed by mounting the sections one after another, and in contact with each other.

In another embodiment, each joist is formed by a supporting body, made e.g. of wood or aluminum, and a saw-tooth contour layer, made e.g. of plastic or metal, attached on the body. The supporting base may extend along the entire length of the joist. The contour forming layer may be formed by a set of sections, each section forming the supporting surface of one or several recesses. In this case, the joists may be prefabricated, or be assembled on site by first attaching the supporting body, and then attaching the contour layer.

The saw-tooth contour layer may be formed with a trench on each side of the joist, such that any water penetrating between a solar panel and the joist will be collected in said trench and guided down along the joist. Alternatively, compressible sealing layer (e.g. of rubber) is arranged between the supporting body and the saw-tooth contour layer, in which case this compressible sealing layer may be formed with a trench on each side of the joist.

The supporting surface of each recess may be provided with a protruding ridge extending along a central axis of the supporting joist, and adjacent solar panels may be arranged on either side of the protruding ridge, such that the protruding ridge extends at least partially into a gap formed between the adjacent solar panels.

Such protruding ridges even further assist in the alignment and mounting of solar panels. If the joists are carefully (i.e. straight and equidistantly) mounted on the roof they will form a set of solar panel mounting slots, each such mounting slot being defined on either side by protruding ridges, and in its upper side by the end surfaces of the recesses.

The system may further comprise a set of T-profile fixation elements, each T-profile fixation element having a central web positioned in the gap between two adjacent solar panels, and two flanges resting against a respective one of the adjacent solar panels.

Such T-profiles will serve to fixate the solar panels. By providing the surface of each flange facing the solar panels with a compressible sealing layer, the solar panel system becomes even more resistant to water (and even air).

According to one embodiment, the T-profile may be formed to have a saw-tooth contour matching the overlapping solar panels, so as to avoid gaps between T-profile and solar panels. In this case, the T-profile may include a contour-forming element facing the solar panels, and a fixation piece arranged on the contour-forming element. The contour forming element may be made of e.g. plastic, and the fixation element be made of e.g. aluminum.

The supporting surfaces of the recesses may be provided with a compressible sealing layer, to make the roof even more resistant to water (and even air). The compressible sealing layers may be made of a rubber material, e.g. EPDM.

Each solar panel preferably comprises a solar cell array sandwiched between two sheets of glass, improving aesthetic appearance and providing a structurally strong surface. The glass is preferably temperated safety glass.

The solar panel roof system may be formed outside a weather protecting outer cover of the roof, i.e. a "retrofitted" solar panel system mounted on an existing roof construction, such as a tile roof.

Alternatively, however, the solar panel roof is an "integrated" solar panel roof, in itself forming a weather protecting outer cover of the roof. Such solar panel roofs are installed when building a new house, or when replacing an existing roof construction.

The combination of double glass solar panels, t-profiles and compressible sealing layers provide a highly water tight integrated solar panel roof, new to the art. It is noted that this specific design of a solar panel roof is considered to represent a further, and separate, inventive concept, having advantages also when not combined with the first aspect of the invention above.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
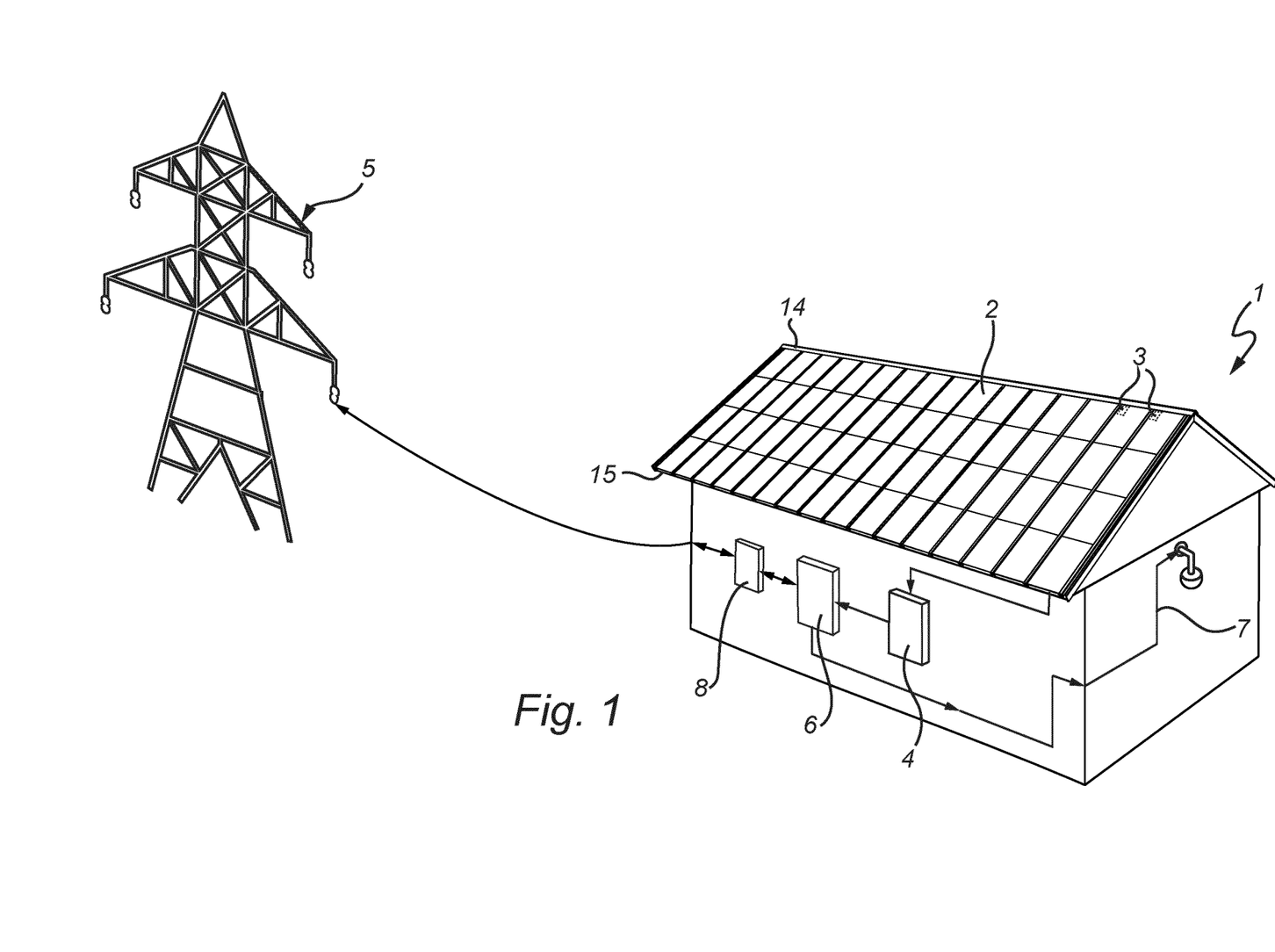
FIG. 1 shows schematically a house provided with a solar panel system.

FIG. 1 shows a house 1 provided with solar panels 2 including solar cells which generate electricity when exposed to sunlight. The solar cells are electrically connected to a power inverter 4 which is configured to convert the generated DC power to AC power compatible with the requirements of the local electrical power grid 5. The inverter 4 is connected to a main controller 6 which is also connected to the electrical system 7 of the house 1 and to the grid 5. The controller is configured to provide the electrical system of the house with electrical power from the solar panels 2 when such power is available, and otherwise to provide electrical power from the grid 5. The system also includes a monitoring/metering unit 8, which measures how much power from the solar panels 2 that is output to the grid 7, and also how much power that is drawn from the grid 5. Additionally, the inverter 4 may be connected to a high power battery device 9, in order to store electrical energy for future personal use instead of outputting in to the grid 5.

In FIG. 1, the inverter 4 is a single unit, in which case all solar panels are connected in series to the single inverter 4. Such a single inverter is sometimes referred to as a "string inverter". Each panel may be provided with a power optimizer 3, which, as the name implies, is configured to condition the generation of electrical power in the particular solar panel to optimally fit with the operation of the string inverter 4. The controller 6 is then connected to control each power optimizer 3.

Alternatively, each solar panel is provided with a separate inverter, sometimes referred to as a "microinverter". Although more expensive, this may be more efficient, especially if the panels are partly shaded, or mounted at different angles toward the sun.

Power optimizers and microinverters, i.e. power electronics arranged in association with each solar panel, are sometimes referred to as "module-level power electronics", or MLPE.

Figure 2A:
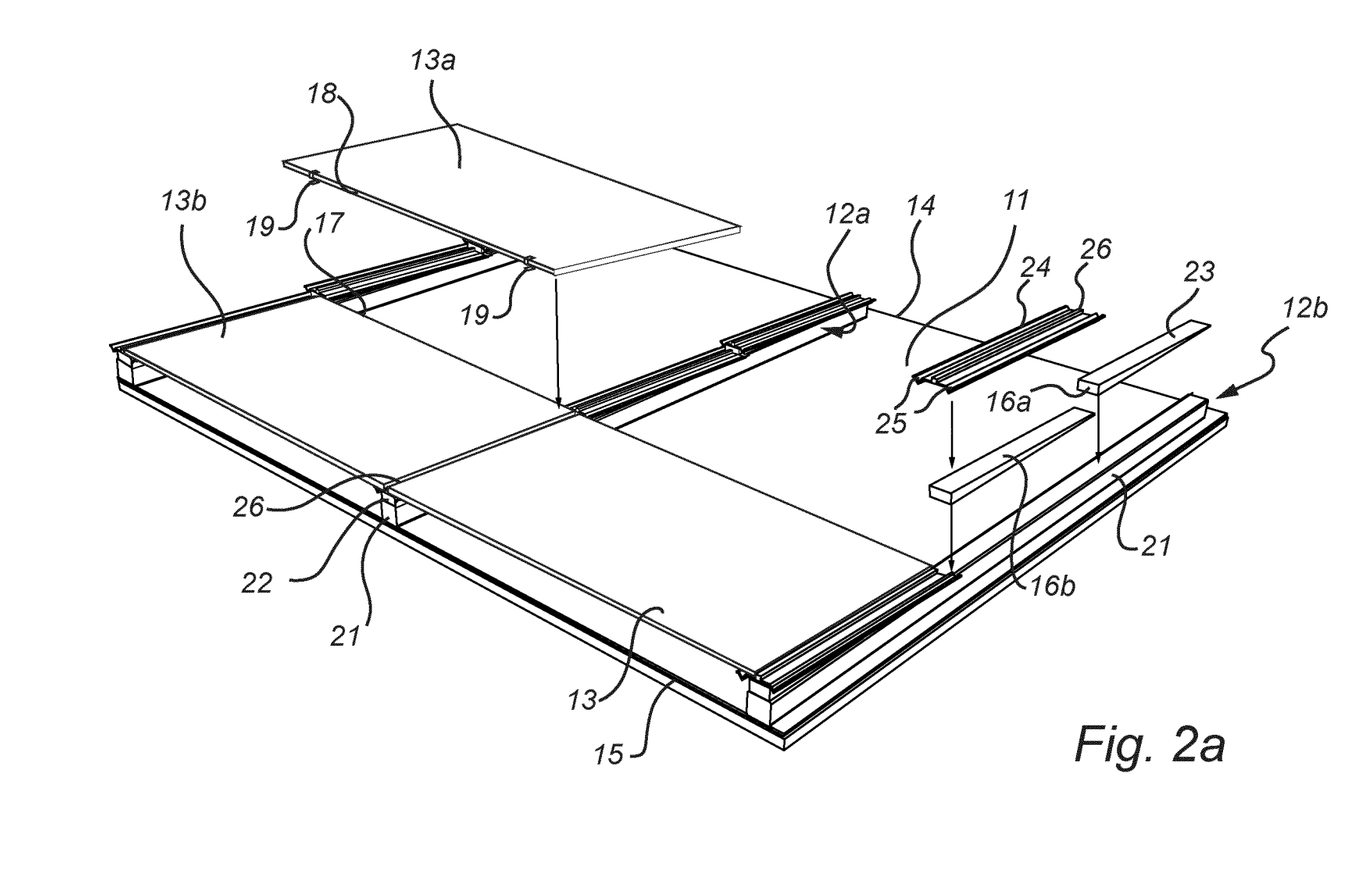
FIG. 2a-d show various examples of joist for solar panels systems according to embodiments of the invention.
Figures 2B, 2C, 2D:
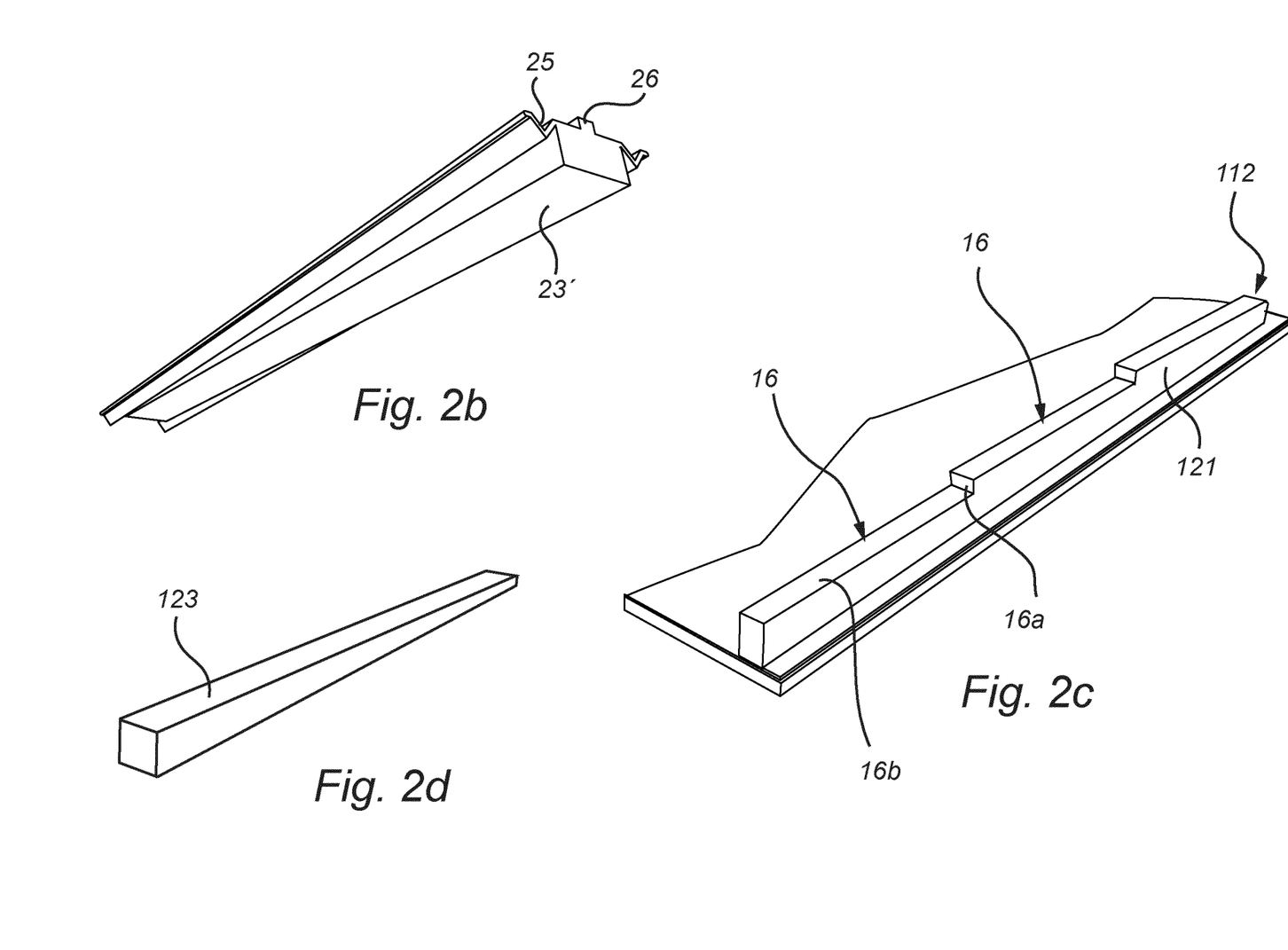

FIGS. 2a-c show an integrated solar panel roof according to embodiments of the invention. An integrated solar panel roof is here understood to provide a combined function of solar cells and outer protection (against weather, pressure, wear, etc.) of the roof. In other words, when installing an integrated solar panel roof, no regular roof tiling is required in areas where the solar panels are located. Such integrated solar panels are commercially available, e.g. from Gruppsol AB. In this case, each solar panel comprises a solar cell grid sandwiched between two glass panels. The glass is preferably temperated (safety) glass to provide a structurally strong surface. The panels may be 1 m by 1.65 m, but other dimensions are of course possible.

With reference to FIG. 2a, the system here has an underlying roof surface 11, e.g. tar paper on wood. On this surface is arranged a set of joists 12, onto which the solar panels 13 are arranged. As shown in FIG. 1, the solar panels cover substantially the entire roof, but it is equally possible to combine the integrated solar panels with conventional tiling.

Each joist 12 extends in the vertical direction of the roof, i.e. between the upper ridge 14 and the lower edge 15 of the side of the roof, and substantially normal to upper ridge 14. The joists 12 are arranged at a center-to-center (cc) distance adapted to the width of the solar panels 13 that are to be mounted thereon.

According to the invention, each joist is formed with a plurality of wedge-shaped recesses 16, each recess having, in an end closest to the upper ridge, an end surface 16a normal to the roof extending across the width of the joist, and a flat, sloping supporting surface 16b meeting with a bottom edge of the end surface 16a. As shown in FIG. 2a, the plurality of recesses 16 together form a saw-tooth contour.

Each solar panel 13 is arranged to rest against the supporting surfaces 16b of recesses 16 of two adjacent joists 12a, 12b, such that an upper edge 17 (the edge facing the ridge 14 of the roof) meets the end surfaces 16a of the recesses 16. The depth of the recess (i.e. the height of the end surface 16a) substantially corresponds with the thickness of the solar panel 13, such that the upper edge 17 is level with the supporting surface 16b immediately above it. As a consequence, the lower edge 18 of an upper panel 13a can protrude over the upper edge 17 of a lower panel 13b, while being supported by the supporting surfaces 16b as well as the upper edge 17.

The panels 13 are mounted from the bottom, i.e. beginning with a row closest to the edge 15 of the roof. The next row is then mounted above the first, with the lower edge 18 of the second row panels slightly overlapping the upper edge 17 of the first row panels.

Optionally, clips 19 may be provided to ensure that an panels in an upper row do not slide down over the panels in a lower row.

The joists 12a, 12b in FIG. 2a comprise a lower supporting body 21, here extending along the entire length of the joist. On top of that is arranged a contour forming layer 22, here formed by a set of wedge-shaped sections 23, so that each wedge 23 forms the supporting surface 16b of one recess 16.

The bodies 21 may be wooden or metal profile joists of standard dimensions, and may be mounted using conventional fastening means, such as screws, nails, etc. The layer 22, e.g. the sections 23, can then be mounted on the bodies 21 either before mounting on the roof 11 or on site after attaching the bodies 21.

In the illustrated example, each joist further comprises an upper element 24 covering each supporting surface 16b. The element 24 may be formed in a water resistant material, such as plastic or rubber, and include trenches 25 on either side. These trenches will serve to guide any water penetrating the edge of a panel down towards the lower edge 15 of the roof.

The element 24 may also have a centrally located protruding ridge 26. This ridge 26 will extend at least partially into a gap formed between two adjacent panels, for example the panels 13 and 13b in FIG. 2a, and even more clearly in FIG. 3. During mounting of the panels, such a ridge 26 will serve as a guide, to facilitate the arrangement of solar panels 13 onto the joists 12. Each panel 13 will be guided sideways by the ridges 26, and guided upwards by the end surfaces 16a.

It is noted that in the absence of a covering element 24, the ridge 26 may be formed in the contour forming layer 23.

FIG. 2b shows an example where not only the ridge 26, but also the trenches 25 have all been integrated into a section 23' of the contour forming layer. Such a section 23' may e.g. be formed of molded plastic.

FIG. 2c shows another example of a joist 112, here made of one single piece 121, e.g. of wood or aluminum. For manufacturing purposes, especially in the case of wood, it may be preferably to make the joist as s set of right trapezoid pieces 123, as shown in FIG. 2d.

Figure 3:
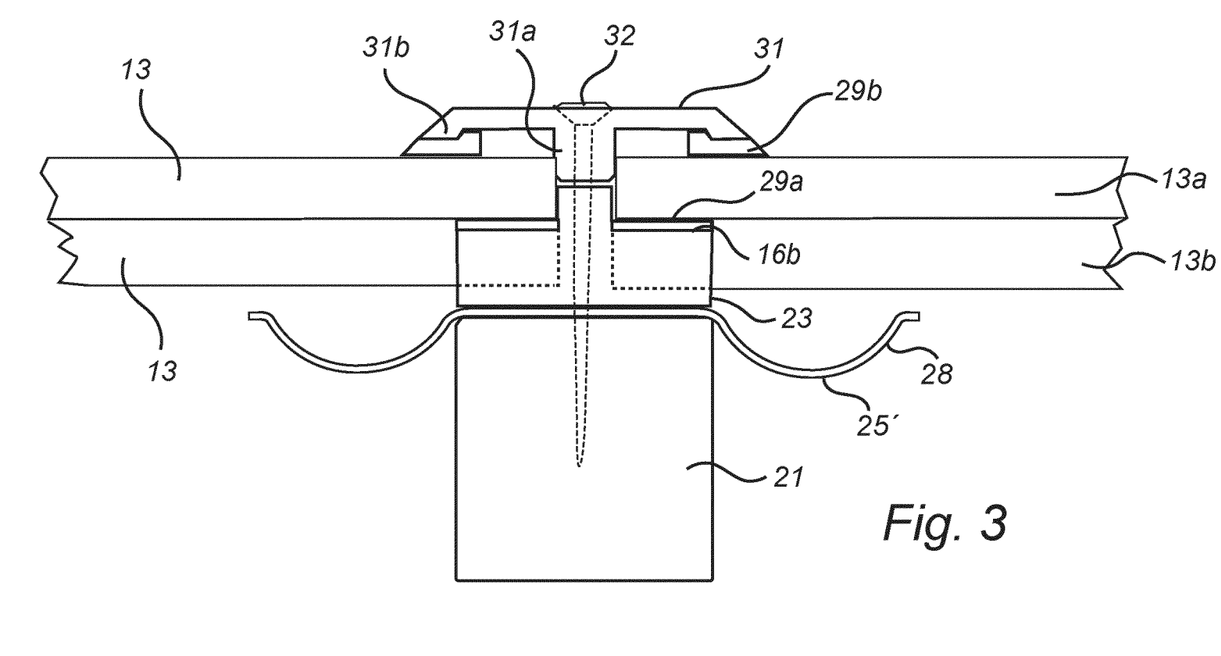
FIG. 3 shows a cross section of a joist supporting two solar panels in a system according to another embodiment of the invention.

FIG. 3 shows in more detail a set of panels 13, 13a, 13b resting on a joist 12. Similar to FIG. 2a, the joist 12 includes a supporting body 21 and a contour forming section 23. In this case, however, a trench forming element 28 is sandwiched between the body 21 and section 23. The element 28 maybe formed by extruded rubber or plastic, and forms a trench 25' on either side of the joist 12, similar in function as the trenches 25 in FIG. 2a.

Further, a protrusion 26 is formed directly in the section 23. Each panel 13, 13a, 13b abuts against the protrusion 26, and rests on a compressible sealing layer 29a provided on the supporting surface 16b of the section 23. The sealing layer 29a may be made of a rubber material, e.g. EPDM. In addition to providing a water sealing, the sealing layer may also provide shock absorption protecting the panels.

Also shown in FIG. 3 is a T-profile fixation element 31, having a central web 31a and two flanges 31b. The element 31 is arranged such that the web 31a extends down into the gap between two adjacent solar panels, and towards the protrusion 26. The flanges 31b press against a respective one of the adjacent solar panels. The underside of the flanges 31b is here provided with a compressible sealing layer 29b similar to the layer 29a. The element 31 is held in place by suitable fixation means, here nails 32.

The length of the element 31 here preferably has the same length as one solar panel 13, so that each element fits in the saw-tooth shape formed by the overlapping panels. This principle is shown more clearly in FIG. 5b, with respect to a different embodiment.

The design in FIG. 3, and in particular the sealing layers 29a, 29b, ensures that the solar panel roof system is highly weather resistant. In the event water does penetrate the edges of the panels 13, such water can follow the trenches 25' out from the roof system.

Figure 4A:
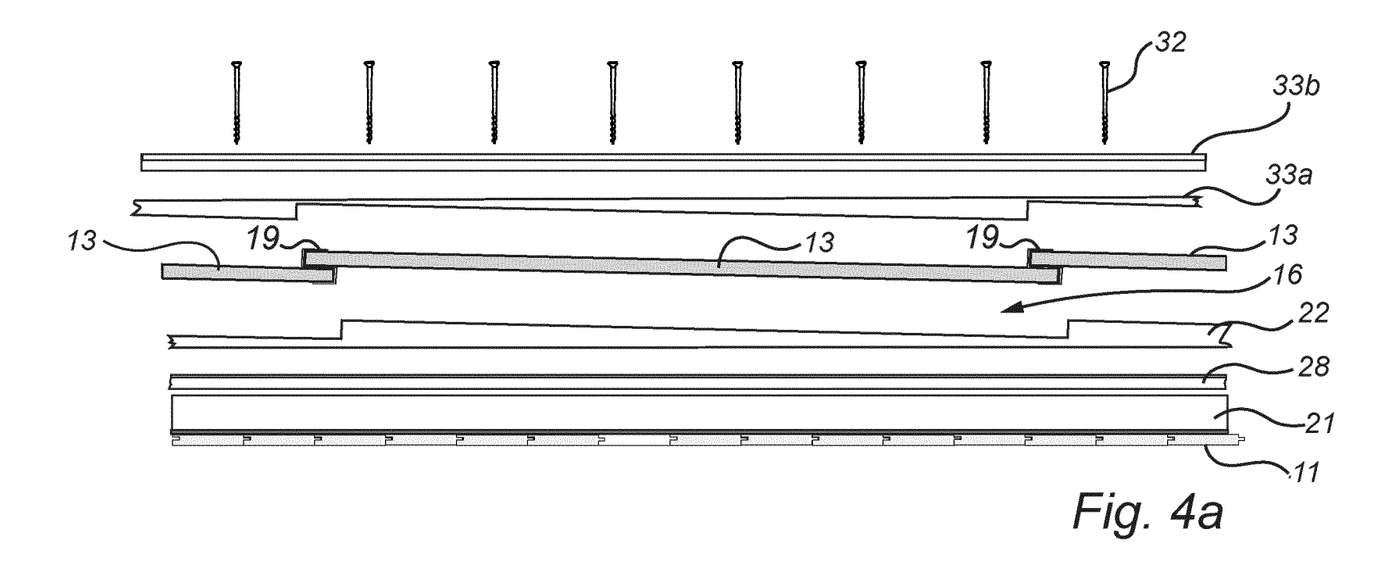
FIG. 4a is an exploded side view of a solar panel system, according to a further embodiment of the invention.
Figure 4B:
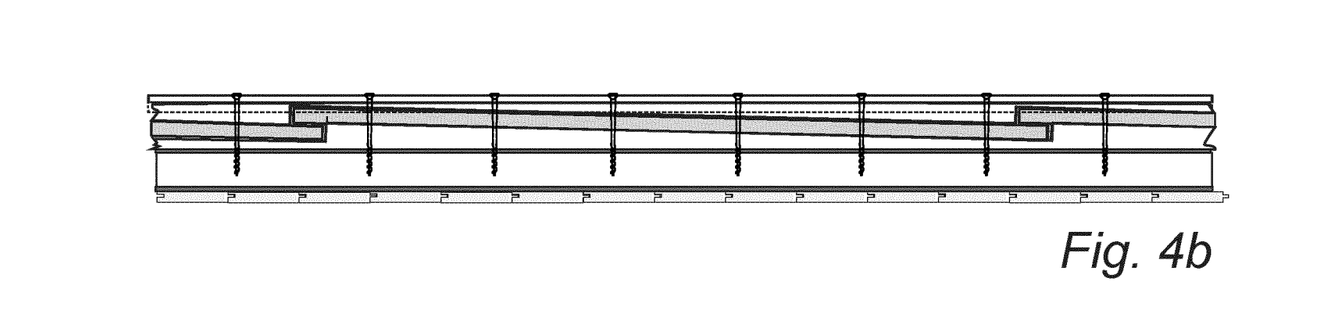
FIG. 4b is shows the system in FIG. 4a in assembled state.

Turning now to FIG. 4a-b, there is shown a panel roof system according to a further embodiment. The system is similar to that in FIG. 3, and again includes a joist 12 formed of a body 21 and a contour forming layer 23, with a trench forming element 28 sandwiched therebetween. Panels 13 are arranged in the recesses 16, and held in place by a fixation element 33a, 33b. Here, however, the fixation element includes a first contour forming layer 33a, shaped to match the saw-tooth shape created by the overlapping panels 13, and an upper cover 33b. The cover 33b and contour forming layer 33a are held in place by fastening means, e.g. nails 32.

The contour forming layer 33a serves to bridge the saw-tooth shape that forms between overlapping panels. As a result, the cover 33b can extend along the entire roof, instead of being divided into sections (like in FIG. 5b). Another benefit is that the relatively thin cover 33b can be made of a highly weather-resistant material, such as aluminum, and be possible to manufacture in a cost efficient manner (e.g. extrusion). The contour-forming layer 33a, on the other hand, can be made of a less expensive material, such as plastic, which more easily can be formed in the required shape.

Figure 5A:
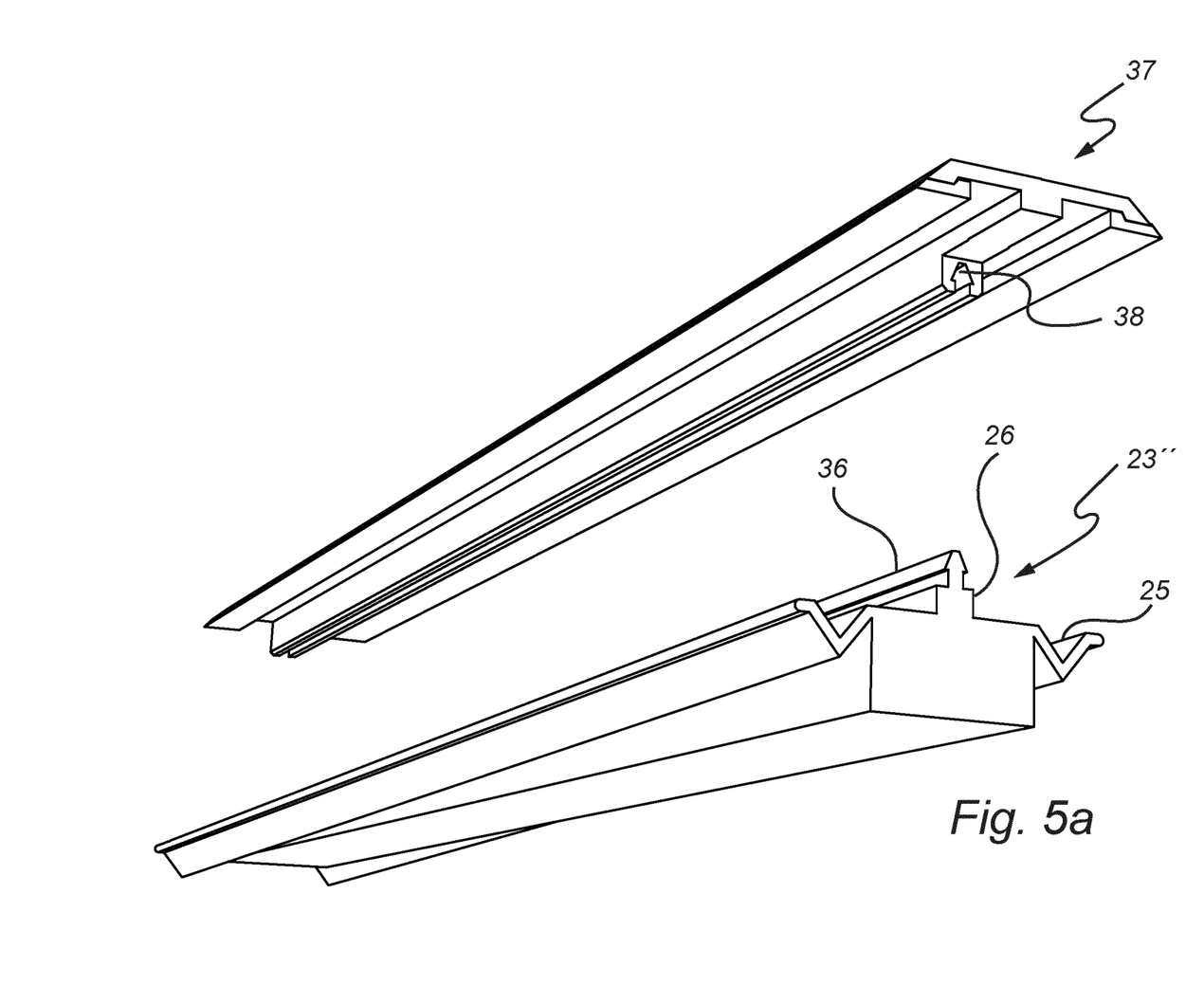
FIG. 5a-b illustrate a solar panel system according yet another embodiment of the invention.
Figure 5B:
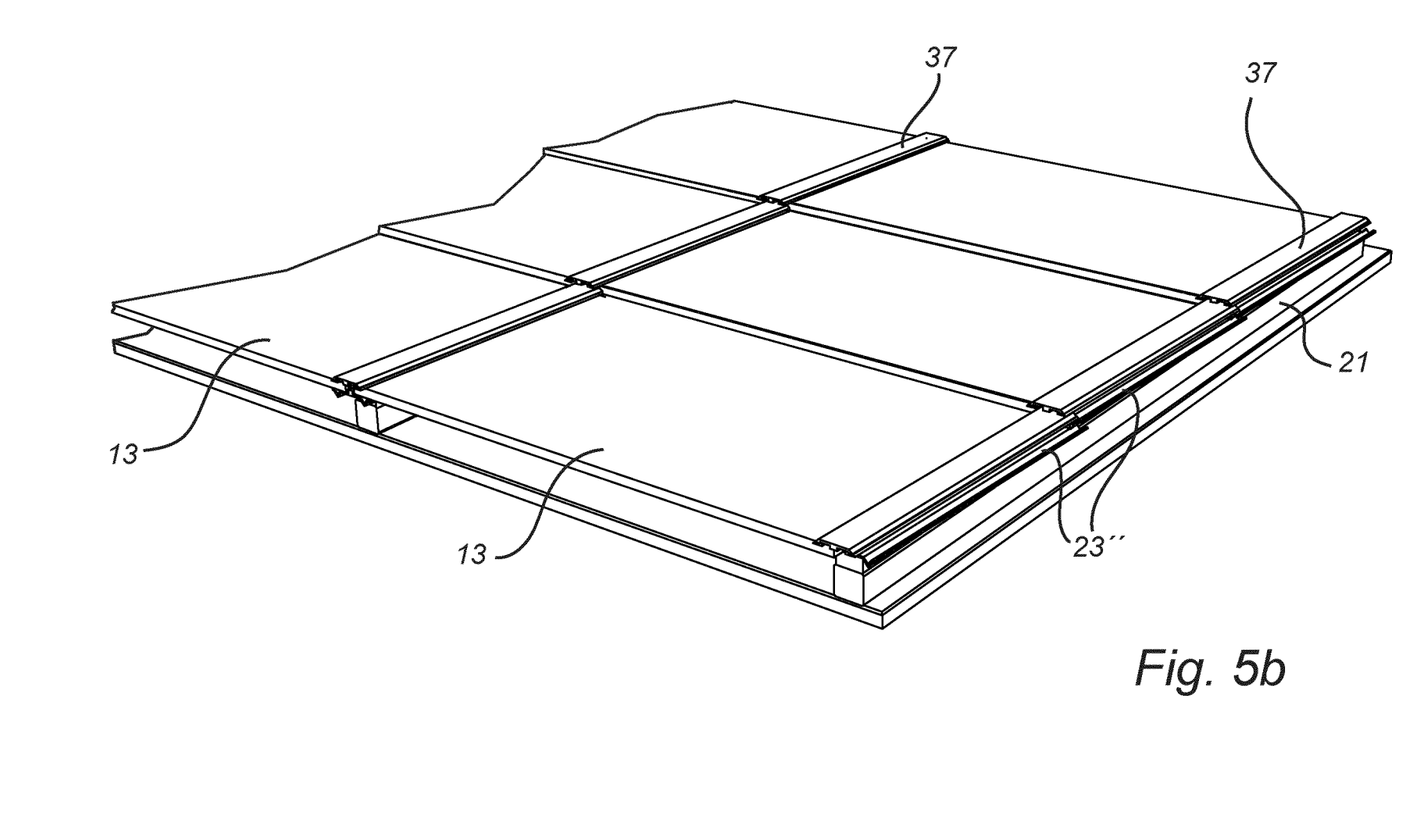

FIG. 5a-5b show yet another embodiment of a solar panel roof system according to the invention. The joists 12 are here similar to those in FIG. 2a and FIG. 2b, and thus include a supporting body 21 and a sectioned contour forming layer 22. As shown in FIG. 5a, each section 23" is integrally formed with trenches 25 and protruding ridge 26, similar to the section 23' in FIG. 2b. In addition, the element 37 is here provided with an male snap-fit portion 36 along the ridge 26. The system further comprises t-profile fixation elements 37, similar to the elements 31 in FIG. 3, but in this case each element 37 is provided with a female snap-fit portion 38, matching the portion 36.

As shown in FIG. 5b, each element 37 is adapted to extend along one panel 13. Further, a lower end 37a of each element 37 is here adapted to extend over an upper end 37b of an adjacent element 37.

The person skilled in the art realizes that the present invention by no means is limited to the preferred embodiments described above. On the contrary, many modifications and variations are possible within the scope of the appended claims. For example, other choices of material and manufacturing techniques may be considered.

The invention claimed is:

1. A solar panel system mounted on a roof of a building, comprising:
   a plurality of supporting joists arranged substantially normal to an upper ridge of the roof, and extending from said upper ridge to a lower region of the roof, and
   a set of rectangular solar panels, each solar panel supported along opposing sides by two said supporting joists,
   wherein each respective joist is formed with a plurality of wedge-shaped recesses, each recess having, in an end closest to the upper ridge, an end surface normal to the roof extending across a width of the respective joist, and a flat, sloping supporting surface meeting with a bottom edge of the end surface, said plurality of recesses together forming a saw-tooth contour, said end surface having a height substantially corresponding to a thickness of said solar panels, wherein each solar panel is received in respective wedge-shaped recesses of respective supporting joists, resting on respective supporting surfaces of said respective recesses with an upper edge of each solar panel meeting respective end surfaces of said respective recesses, and wherein an upper said solar panel has a lower edge which protrudes over an upper edge of a lower said solar panel in an overlapping manner,
   further comprising a set of fixation elements configured to fix the solar panels to the supporting joists, each fixation element having a saw-tooth contour matching the overlapping solar panels.

2. The system according to claim 1, wherein each of the fixation elements includes a first contour forming layer, shaped to match the saw-tooth shape created by the overlapping solar panels, and an upper cover.

3. The system according to claim 1, wherein each joist includes a set of separate right trapezoid sections, each section forming one of said supporting surfaces.

4. The system according to claim 1, wherein each solar panel comprises a solar cell array sandwiched between two sheets of glass.

5. The system according to claim 1, wherein each joist is provided with a trench on opposing sides thereof, such that any water penetrating between a respective said solar panel and the respective joist is collected in said trench and guided down along the respective joist.

6. The system according to claim 1, wherein the system forms a weather protecting outer cover of said roof.

7. The system according to claim 1, wherein the system is formed outside a weather protecting outer cover of said roof.

8. The system according to claim 1, wherein the supporting surfaces of said recesses are provided with a compressible sealing layer.

9. The system according to claim 8, wherein the compressible sealing layer is made of a rubber material.

10. The system according to claim 1, wherein each joist comprises a lower supporting body and a saw-tooth contour layer mounted on said lower supporting body.

11. The system according to claim 10, wherein each saw-tooth contour layer includes a set of sections, each section forming one of said supporting surfaces.

12. The system according to claim 10, wherein each saw-tooth contour layer is formed with a trench on opposing sides of the respective joist, such that any water penetrating between a respective said solar panel and the respective joist is collected in said trench and guided down along the respective joist.

13. The system according to claim 10, wherein a compressible sealing layer is arranged between each supporting body and each saw-tooth contour layer, said compressible sealing layer being formed with a trench on opposing sides of the respective joist, such that any water penetrating between a respective said solar panel and the respective joist is collected in said trench and guided down along the respective joist.

14. The system according to claim 1, wherein the supporting surface of each recess is provided with a protruding ridge extending along a central axis of the respective supporting joist, and wherein adjacent solar panels are arranged on either side of said protruding ridge, such that said protruding ridge extends at least partially into a gap formed between the adjacent solar panels.

15. The system according to claim 14, wherein the fixation elements have a T-profile, each T-profile fixation element having a central web positioned in the gap between two adjacent solar panels, and two flanges resting against a respective one of the adjacent solar panels.

16. The system according to claim 15, wherein each T-profile fixation element includes a contour-forming element facing the solar panels, and a fixation portion arranged on the contour-forming element.

17. The system according to claim 15, wherein each flange is provided with a compressible sealing layer.

18. The system according to claim 17, wherein the compressible sealing layer is made of a rubber material.

* * * * *